Oct. 11, 1949.　　　　J. T. O'HARA　　　　2,484,641
METHOD OF SEPARATING ADHERING
SHEETS BY AN AIR BLAST
Filed Oct. 12, 1945
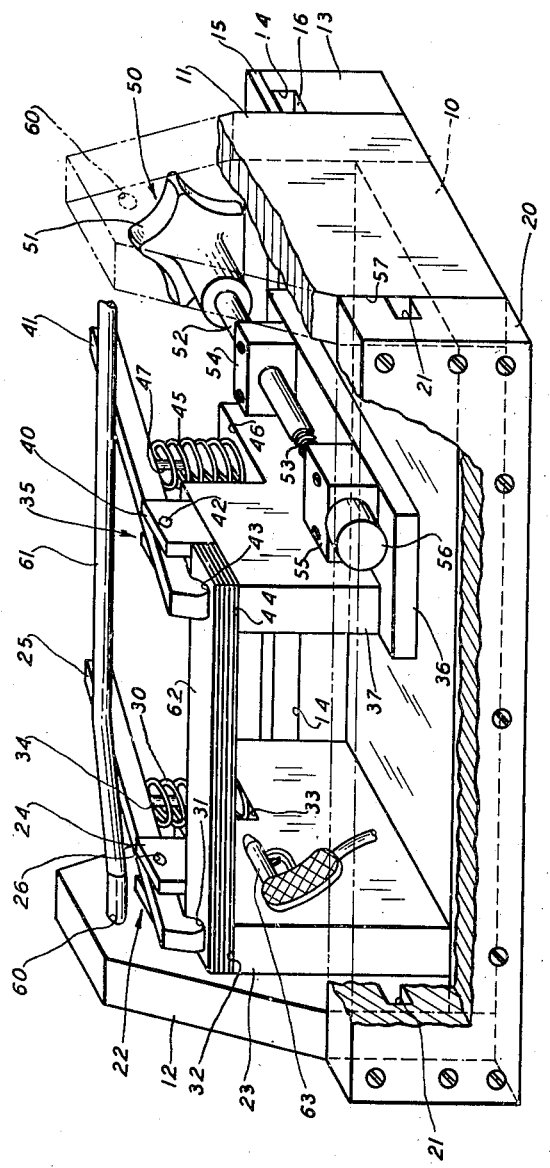
INVENTOR
J.T. O'HARA
BY
ATTORNEY Patented Oct. 11, 1949

2,484,641

UNITED STATES PATENT OFFICE 2,484,641

METHOD OF SEPARATING ADHERING SHEETS BY AN AIR BLAST

James T. O'Hara, Dundalk, Md., assignor to Western Electric Company, Incorporated, New York, N. Y., a corporation of New York Application October 12, 1945, Serial No. 621,894

2 Claims. (Cl. 271—26)

1

This invention relates to methods of separating adhering sheets and more particularly to methods of separating adhering sheets of paper impregnated with cohesive material.

It is a well known fact that certain types of paper are used for insulating purposes in the manufacture of magnet coils, relays, resistors and the like. To further improve the insulating qualities of the paper sheets, they are often impregnated with beeswax or similar substances. In that case the standard practice is to place a ream of paper, such as onion skin paper, in a vat of molten beeswax whereby the entire ream of paper is impregnated with the beeswax. The impregnated ream then is passed between rollers to force out the excess beeswax and is allowed to cool. Upon cooling, the beeswax assumes its normal solid state, whereupon the individual sheets of the ream of paper firmly adhere to each other, forming a laminated paper slab.

In order that the paper may be used for its ultimate purpose, it is necessary for the manufacturer to cut the impregnated reams into laminated paper bars, which will produce individual insulating strips of impregnated paper having a definite length and width. However, in order to obtain individual strips of impregnated paper, they must be separated from the laminated paper bar sheet by sheet, which heretofore has been done by hand. The hand method is quite a tedious and lengthy operation due to the cohesive qualities of the beeswax and the mechanical pressure that has been applied to the impregnated laminated paper bar during the rolling and cutting operations.

It is an object of the present invention to provide new and effective methods of separating adhering sheets, and particularly to provide new and improved methods of separating the sheets of impregnated, laminated paper bars.

The present invention eliminates the hand method of separating the sheets from the impregnated paper bar by providing methods wherein the edge of the laminated paper bar is subjected to a controlled air jet which separates the paper bar into its individual sheets.

In accordance with one embodiment of the invention, an impregnated laminated paper bar is clamped at its ends to a pair of upright supports mounted on a suitable base, whereupon a

2 controlled jet of air is manually directed upon the edge of the laminated paper bar by means of an air gun. The strength of the air jet is adjusted at the gun so that it has sufficient force to separate the laminated paper bar into its individual sheets.

A clear understanding of the invention may be had by reference to the following detailed description of a method and apparatus forming one embodiment thereof, when considered in conjunction with the accompanying drawing illustrating said embodiment, wherein the single figure is a perspective view of an apparatus embodying the invention, which may be used for practicing a method embodying the invention, having portions thereof broken away for reasons of clarity.

Referring to the drawing, a rectangular base 10 has secured to right and left ends thereof a pair of upright end members 11 and 12, respectively. A rear wall 13 is rigidly secured to the base 10, and extends to the extremities of the end members 11 and 12. The inside upper edge of the wall member 13 is cut away to form a recess 14 therein. A flat strip 15 is secured to the top edge of the rear wall 13 and serves to cover the recess 14 to form a groove 16.

A front wall 20 is rigidly secured to the base 10 and has provided therein a groove 21, which is directly in line with the groove 16 of the rear wall 13. Rigidly secured to the base 10 and the front wall 20 and adjacent to the left end member 12 is a clamping assembly 22. The clamping assembly 22 comprises an upright support 23, a U-shaped bracket 24 secured on the top of support 23, a clamping bar 25 pivotally mounted in the U-shaped bracket 24 by means of a pin 26, and a spring 30 serving to force a lobe 31 on the end of the clamping bar 25 against a surface 32 of the upright support 23. The spring 30 is positioned in a recess 33 formed in the upright support 23 and is maintained in engagement with the clamping bar 25 by means of a pin 34 secured to the clamping bar 25.

An adjustable clamping assembly 35 is slidably positioned in the grooves 16 and 21 so that it may be selectively positioned between the end members 11 and 12. The clamping assembly 35 comprises a rectangular base member 36 which fits neatly into the grooves 16 and 21. Rigidly secured to the base 36 is an upright support 37 having secured on the top thereof a U-shaped bracket 40. A clamping bar 41 is pivotally mounted in the U-shaped bracket 40 by means of a pin 42 and has a lobe 43 on the end thereof urged against the surface 44 of the upright support 37 by a spring 45. The spring 45 is positioned in a recess 46 provided in the upright support 37 and is maintained in engagement with the clamping bar 41 by means of a pin 47 secured to the bar 41. The slidable clamping assembly 35 is provided with a locking device 50 whereby the clamping assembly 35 may be fixed in any desired position within the limits of the end members 11 and 12.

The locking device 50 comprises a hand wheel 51 secured on one end of a shaft 52 which is provided with a threaded portion 53 substantially at the other end thereof. The shaft 52 is rotatably mounted in a bearing 54 secured to the rear of the base 36 and threadedly mounted in a bearing 55 which is rigidly secured near the front end of the base 36. A swivel 56 is rotatably mounted on the threaded end of the shaft 52, which extends through the threaded bearing 55 and serves to press against the surface 57 of the wall member 20 when the hand wheel 51 is turned in a counterclockwise direction, thereby locking the clamping assembly 35 against horizontal movement. The end members 11 and 12 are provided with apertures 60—60 in which is rotatably mounted an arm 61, which serves to simultaneously engage the clamping bars 25 and 41 substantially at the ends thereof.

When it is desired to clamp a laminated impregnated paper bar 62 on the clamping assemblies 22 and 35, the arm 61 is urged downwardly so as to disengage the lobes 31 and 43 from the surfaces 32 and 44, respectively. The laminated paper bar 62 is placed on the surfaces 32 and 44 and then the arm 61 is released, whereupon the lobes 31 and 43 of the spring-pressed clamping bars 25 and 41 engage the ends of the laminated paper bar 62 and firmly secure the paper bar 62 to the supports 23 and 37.

An air gun 63 connected to a compressed air supply (not shown) serves to direct a controlled jet of air along the edge of the laminated paper bar 62 to blow apart and separate the individual laminations thereof.

The operation of the above-described apparatus is as follows: the slidable clamping assembly 35 is positioned the required distance away from the fixed clamping assembly 22 to accommodate a laminated impregnated paper bar of a given length and the clamping assembly is clamped in this position by means of the locking device 50. The bar 61 is urged downwardly to disengage lobes 31 and 43 from the surfaces 42 and 47, respectively, and an impregnated, laminated paper bar 62 is inserted therebetween. The arm 61 then is released, whereby the spring-pressed bars 25 and 41 firmly clamp the paper bar 62 to the supports 23 and 37. The operator then directs a controlled jet of air against the edge of the laminated paper bar 62, thereby forcing air in between the plurality of laminations and separates them one from the other throughout its entire unobstructed length between the supports 22 and 37.

After the center portions of the sheets are separated, the clamped ends of the laminated paper bar 62 are separated by first unclamping an end thereof and directing the air jet thereagainst. Then the separated end of the bar is reclamped and the other end of the bar is unclamped and the air jet is directed against the free end to separate the laminations thereat.

What is claimed is:

1. The method of separating the sheets of a laminated paper bar impregnated with beeswax or the like, which comprises securing the ends of the paper bar between spaced supports to prevent movement thereof, directing a controlled air jet across the edge of the paper bar to separate all of the paper laminations intermediate the secured ends one from the other, freeing one of the secured ends of the paper bar, and directing the air jet against the free end of the paper bar to separate all of the paper laminations one from the other at that end of the bar.

2. The method of separating the laminations of a laminated, wax-impregnated paper bar, which comprises securing the ends of the paper bar between spaced supports to prevent movement thereof, directing an air jet across the edge of the paper bar to separate all of the paper laminations intermediate the secured ends one from the other, releasing one end of the paper bar, directing the air jet thereagainst to separate the laminations thereat one from the other, resecuring the separated end, releasing the other end of the paper bar, and directing the air jet thereagainst, to separate the laminations thereat one from the other, whereby all of the laminations of the laminated paper bar are separated throughout the entire length of the bar.

JAMES T. O'HARA.

REFERENCES CITED

The following references are of record in the file of this patent:

UNITED STATES PATENTS

| Number | Name | Date |
|---|---|---|
| 907,193 | Steele | Dec. 22, 1908 |
| 1,243,096 | Perkins | Oct. 16, 1917 |
| 1,567,372 | Jacobson | Dec. 29, 1925 |
| 1,697,752 | Broadmeyer | Jan. 1, 1929 |